United States Patent
Grandjean et al.

[15] 3,638,656
[45] Feb. 1, 1972

[54] METHOD AND APPARATUS FOR MONITORING AND STIMULATING THE ACTIVITY OF THE HEART

[72] Inventors: Theo Grandjean, Lausanne; Juan Ulrich Zumstein, Bolligen; Alfred Liechti, Bern, all of Switzerland

[73] Assignee: Fred Liechti Aktiengesellschaft, Bern, Switzerland

[22] Filed: Aug. 14, 1969

[21] Appl. No.: 850,116

[30] Foreign Application Priority Data

Aug. 26, 1968 Switzerland..........................12746/68

[52] U.S. Cl..........................128/419 P, 128/2.06 F, 128/422
[51] Int. Cl. ..........................................................A61n 1/34
[58] Field of Search ..........................128/419 P, 422, 2.06 F

[56] References Cited

UNITED STATES PATENTS

| | | | |
|---|---|---|---|
| 1,816,465 | 7/1931 | Boas et al. | 128/2.06 F |
| 2,771,554 | 11/1956 | Gratzl | 128/421 |
| 3,109,430 | 11/1963 | Tischler | 128/419 P |
| 3,311,111 | 3/1967 | Bowers | 128/419 P |
| 3,358,690 | 12/1967 | Cohen | 128/419 P |
| 3,523,539 | 8/1970 | Lovezzo | 128/419 P |

*Primary Examiner*—William E. Kamm
*Attorney*—Werner W. Kleeman

[57] ABSTRACT

The intensity of the stimulation pulses from the output stage is increased step-by-step to an adjustable maximum value by a regulating stage. The latter is fed pulses derived from the activity of the heart. When these pulses are absent or late, the value of a shunt combination of resistances is increased in steps until an adjustable maximum value is reached, as determined by a potentiometer connected in parallel with these resistances and also connected to the control electrode of a component in the output stage.

9 Claims, 3 Drawing Figures

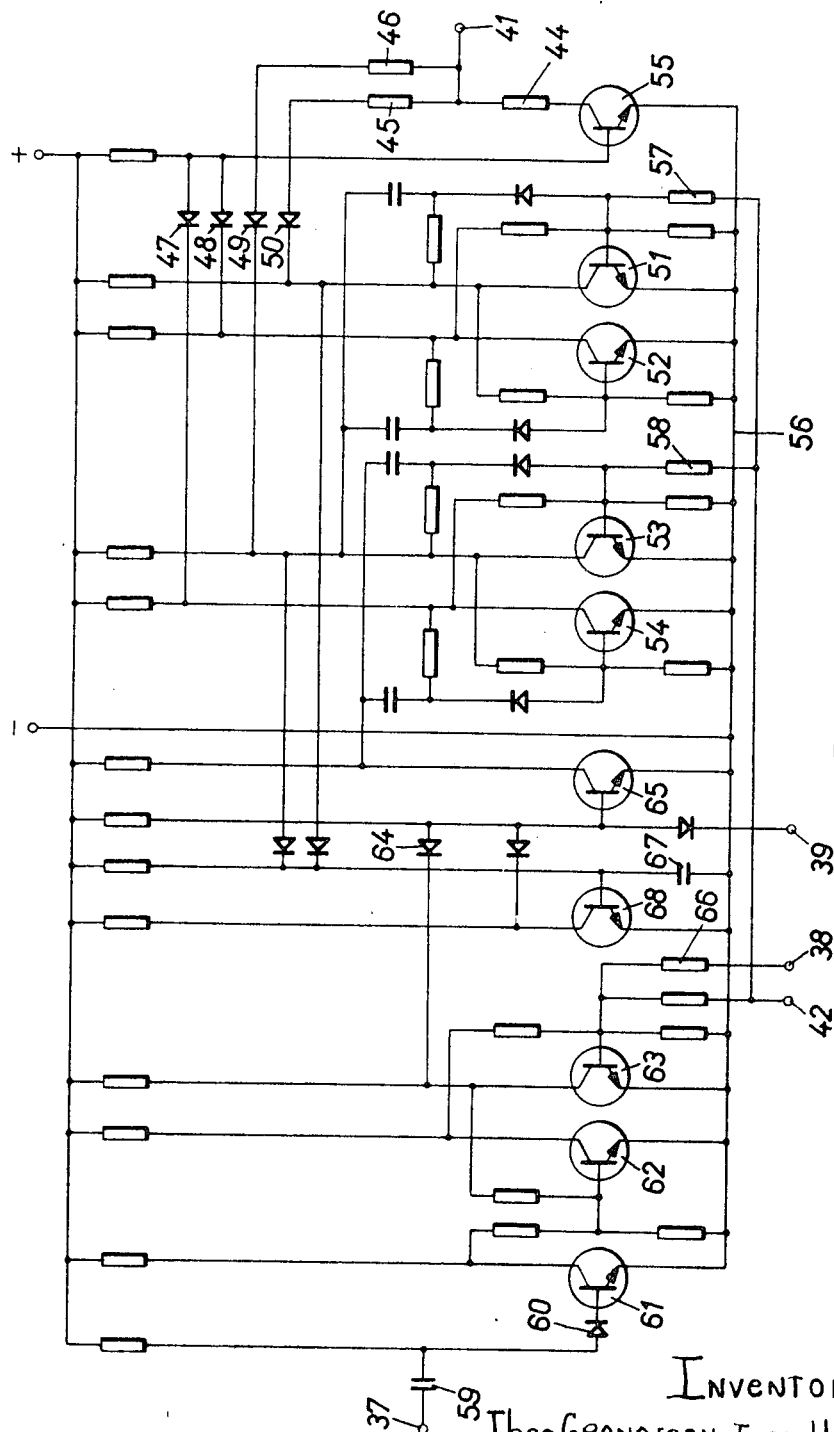

METHOD AND APPARATUS FOR MONITORING AND STIMULATING THE ACTIVITY OF THE HEART

BACKGROUND OF THE INVENTION

The invention relates to a method and to apparatus for monitoring and stimulating the activity of the heart, whereby the movements of the heart are converted into electrical signals, the rate of these signals compared with a standard rate, and a stimulation pulse sent to the heart when the signal rate falls below the standard rate.

Methods and apparatuses are known for monitoring the activity of the heart from the electrical signals of an electrocardiograph. If there is no signal after a predeterminated time, stimulation pulses are generated and sent to the heart. The number of these pulses per unit time and their intensity are varied by hand. These known devices have the disadvantage that if the electrodes, which conduct the pulses to the heart, change their positions, the electrical resistance is changed and, for example, increased. Consequently, the energy sent to the heart by the pulses falls; should it fall below a determined value the heart is not stimulated to contract. On the other hand, the initial value of the current pulses should not be set too great, because the heart is then excessively stimulated, which can lead to harmful effects.

SUMMARY OF THE INVENTION

An object of the invention is to eliminate this disadvantage and to provide a method that both avoids excessive stimulation of the heart and ensures satisfactory operation even when the electrical resistance between the two electrodes changes, and to provide an apparatus for carrying out this method.

This object and others of the invention will be apparent from the following detailed description.

BRIEF DESCRIPTION OF THE DRAWINGS

The invention will be described, with reference to the FIGURES of the accompanying drawings, wherein:

FIG. 3 is a circuit diagram of the regulating stage of the heart stimulator.

DESCRIPTION OF THE PREFERRED EMBODIMENT

Figure 1:
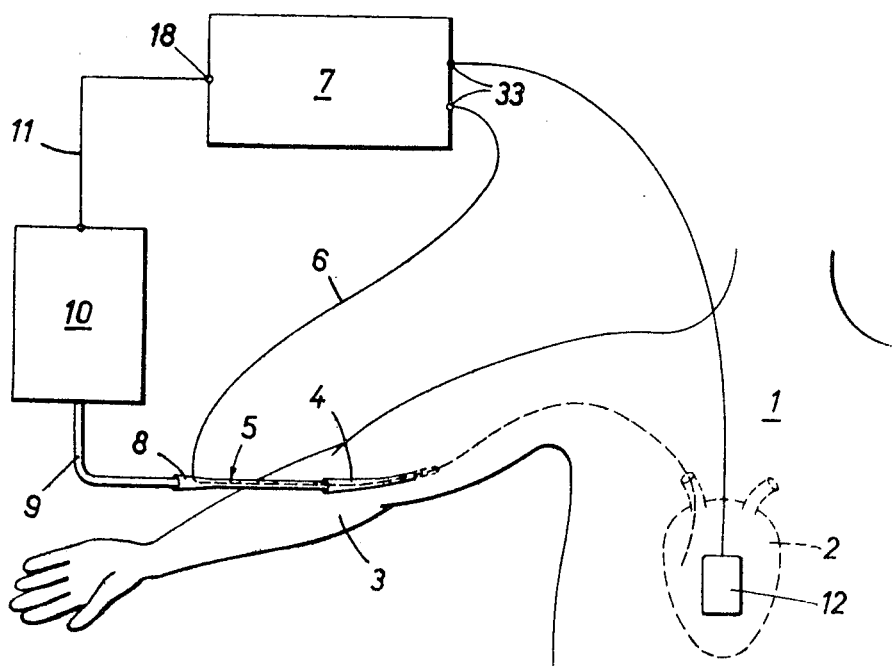
FIG. 1 is a simplified representation of the devices for monitoring and stimulating the heart.

FIG. 1 shows part of a human body 1 with the heart 2 indicated in dashed line. A puncture needle 4 is inserted into a vein of the arm 3. A cardiac catheter 5, shown in dashed line, is pushed through the opening of the needle 4 and extends into the right ventricle of the heart. The cardiac catheter consists essentially of a synthetic plastic tube having on its end located in the heart a metal head (not shown) that acts as an intracardiac electrode. The head is connected by a lead 6 to a unit 7 that henceforth will be called a heart stimulator or PACEMAKER. To the connector 8 of the catheter is connected a tube 9, which couples the catheter to the unit 10. The hollow head, the catheter, and the tube 9 thus connect the inside of the heart with a memberane—closed cavity within the unit 10. This cavity, the tube 9, and the catheter are filled with a liquid, so that the intracardiac pressure acts on the membrane, where it is converted into an electrical signal. A device of this kind is described, for example, in the Swiss Pat. No. 450,620.

The lead 11 conducts the electrical signals from the unit 10 to the PACEMAKER 7. The purpose of the latter is to monitor the regularity of these signals and, if necessary, to generate stimulating pulses, which are conducted to the heart 2 by the intracardiac electrode on the end of the catheter 5 and by a second electrode 12 that is laid against the surface of the body 1 near the heart.

Figure 2:
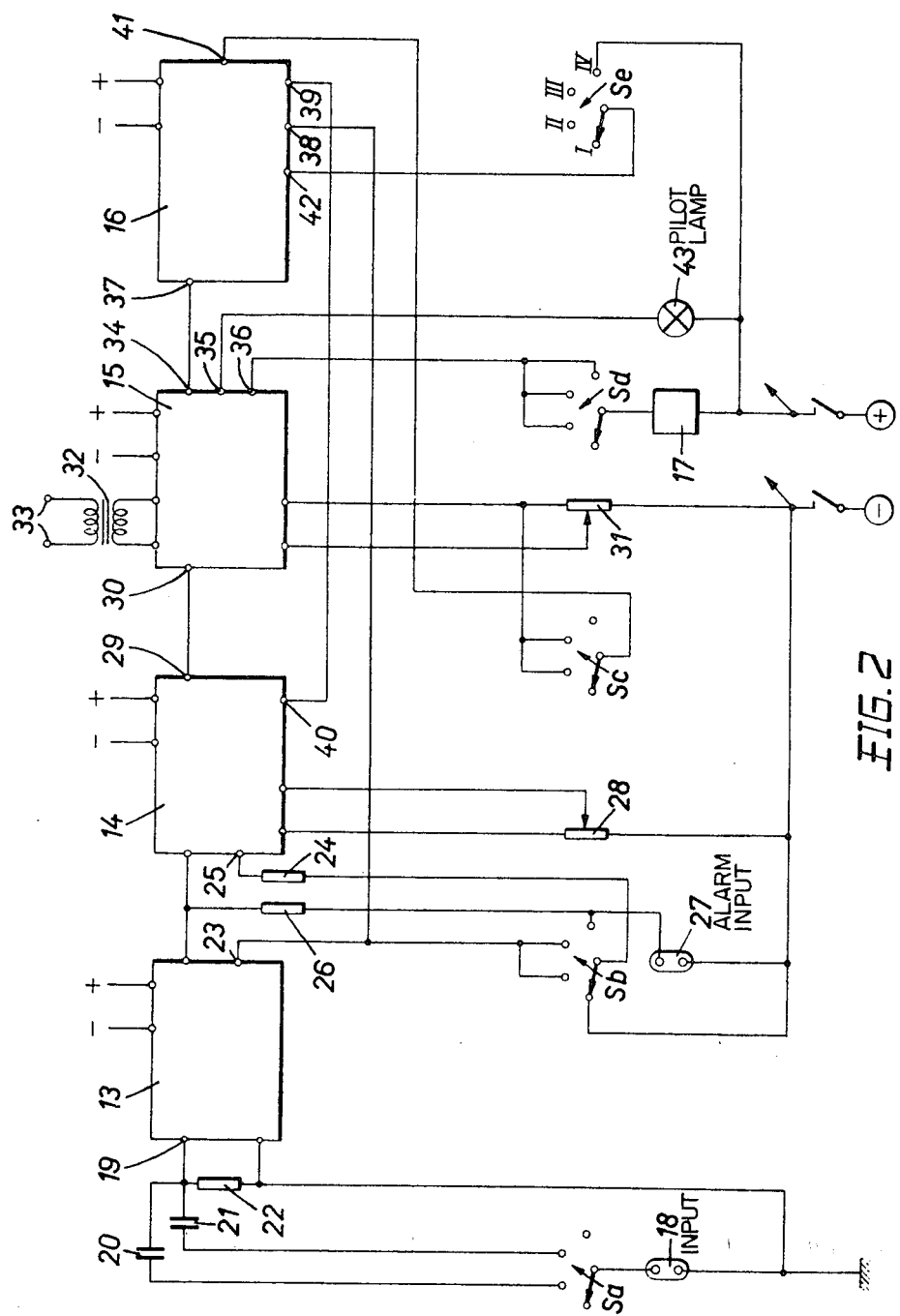
FIG. 2 is a block diagram of the heart stimulator, i.e., PACEMAKER.

FIG. 2 is a basic circuit diagram of the PACEMAKER 7. It essentially comprises an input amplifier 13, a pulse generator 14, an output stage 15, a regulating stage 16, and a pulse counter 17. An operating selection switch controlling five circuits Sa to Se enables the selection of four different kinds of operation.

Position I, "manual": the heart stimulator or PACEMAKER continuously produces stimulating pulses, the number of pulses per unit time and their intensity being varied by hand;

Position II, "abnormal electrocardiogram": the PACEMAKER produces pulses only if the R wave of the electrocardiogram is missing or does not appear at the correct moment;

Position III, "failing intracardiac pressure": the PACEMAKER generates pulses only if the periodic increase of the blood pressure within the heart does not occur at the correct moment or if this blood pressure does not attain a certain minimum value;

Position IV, "automatic": the PACEMAKER can be switched to generate pulses continuously by an external alarm arrangement.

By way of the input 18 and the switch section Sa, the signal from an electrocardiograph can be sent through the capacitor 20, or the signal from the unit 10 sent through the capacitor 21, to the input 19 of the input amplifier 13. In position II of the input switch, the input amplifier 13 responds to the R wave of the electrocardiograph. When the output of the unit 10 is used to monitor the activity of the heart, the switch Sa in position III connects the substantially larger capacitor 21 into the circuit. In order to enable a satisfactory comparison in time with the adjusted rate of the pulse generator 14, the relatively wide pulse generated by the unit 10 is differentiated by the RC combination 21 and 22, so that only the leading edge of this pulse is used to drive the input amplifier.

The output 23 of the input amplifier 13 is connected by the switch section Sb and a resistor 24 to the input 25 of the pulse generator 14, for turning the pulse generator on and off. In position I, the input 25 is connected to a negative potential, so that the pulse generator continuously produces pulses. In position IV, the input 25 is connected by a resistance 26 with a positive voltage that shuts off the generator 14, and is also connected to an alarm input 27, which can be connected to a negative voltage of an external alarm (not shown) to turn on the generator 14.

The pulse generator 14 has a charging capacitor (not shown) that is periodically charged through a charging resistance (also not shown). The value of the latter can be changed by a potentiometer 28, enabling the number of pulses per unit time to be continuously varied through a limited range.

The pulses of the generator 14 are conducted from the output 29 of the latter to the input 30 of the output stage 15. Means, not shown, convert these pulses into square waves of 2 ms duration, which are conducted through a second potentiometer 31 to the control electrode of a power amplifier component to regulate the intensity of the stimulation pulse. A transformer 32 is connected into the load circuit of this component. The secondary winding of the transformer is provided with terminals for connection to the intracardiac electrode and to the external electrode 12, shown in FIG. 1.

The hot end of the potentiometer 31 is connected to the switch section Sc, so that the hot end, in position II and III of this switch section, can be connected to an adjustable resistance (to be described) in the regulating stage 16. This adjustable resistance is so connected that in switch positions II and III it shunts the potentiometer 31, enabling the stage 16 to regulate automatically the intensity of the stimulation pulses.

The output stage 15 has three additional outputs 34, 35 and 36, and the same number of pulses appear at these three outputs as the output stage sends to the two electrodes. Means, not shown, appreciably lengthen these pulses, so that a pilot lamp 43, for example, connected to the output 35, clearly lights up with each pulse. This pilot lamp provides a visual indication that the generator 14 and the output stage 15 are operating satisfactorily. The output 36 of the stage 15 is connected by the switch section Sd to a pulse counter 17 that records the number of pulses of stimulation generated in the switch positions II, III, and IV.

The output 34 is connected to the first input 37 of the regulating stage 16, which has two additional inputs 38 and 39. The signal appearing at the output 23 of the input amplifier 13 is also conducted to the second input 38 to suspend the step-by-step action of the stage 16. The signal appearing at the second output 40 of the pulse generator is conducted to the third input 39 to turn on the step-by-step action of the stage 16. The previously noted adjustable resistance within the regulating stage 16 can be shunted across the potentiometer 31 by the output 41 and the switch section Sc, in positions II and III of the latter.

By conducting through switch Se in position IV a positive voltage to the terminal 42, the automatic step-by-step action of the stage 16 can be returned to the initial stimulation pulse intensity.

The regulating stage 16 is described in detail in connection with the circuit diagram of FIG. 3. The purpose of this stage, in positions II and III of the switch S, is to vary an adjustable resistance shunted across the potentiometer 31, if the stimulation pulses from the output stage cannot cause contractions of the heart.

This adjustable resistance is composed of the three resistances 44, 45, and 46, which, on the one hand, are connected to the output 41 and, on the other, by the diodes 47 to 50 and the transistors 51 to 54, or by only one transistor 55, to a supply line 56 at negative potential. Since the output 41 is connected to the hot end of the potentiometer 31 and the cold end of the latter to the negative line 56, the total resistance of the shunt combination of the resistors 44 to 46 and of the potentiometer 31 can be varied, thereby controlling the intensity of the pulses from the stage 15, by turning on or off the transistors 51 to 55, which act as switches.

The pairs of transistors 51, 52, and 53, 54 each form a bistable multivibrator, or flip-flop circuit. In the initial state, obtained by setting the switch section Se in position IV, the transistors 51 and 53 are on, the bases of these transistors being temporarily connected to a positive voltage through the respective resetting resistance 57 and 58 and the terminal 42. So long as these two transistors conduct, the resistances 45 and 46 are connected between the output 41 and the line 56. The base of the transistor 55 carries a positive voltage, because the diodes 47 and 48 are connected to the collectors of the transistors 52 and 54, which are conducting. Consequently, transistor 55 is also on, so that the resistance 44 is shunted across the two resistances 45 and 46; and the adjustable resistance (44-46), shunted across the potentiometer 31, has its smallest value in this switching state. The intensity of the stimulation pulse produced is, therefore, only a fraction of the value set on the potentiometer 31.

The two multivibrators, previously mentioned, are triggered in the following manner. The value of the adjustable resistance is changed only if a previous stimulation pulse has failed to cause the desired result; in other words, the first pulse from the output stage 15 must not influence the value of the adjustable resistance. A stepwise increase in the value of this resistance is only then desired when the heart does not react to the first stimulation pulse. In consideration of these requirements the regulating stage 16 is provided with three inputs 37, 38, and 39.

The wide pulse present at the output 34 of the output stage 15 is conducted to the input 37, and from there by way of a capacitor 59 and a diode 60 to the base of a transistor 61. The capacitor 59 differentiates the pulse, so that only the trailing edge of it causes a brief surge of current through the transistor 61. The signal appearing at the collector of this transistor is shifted in time with respect to the stimulation pulse by an amount equal to the duration of the pulse conducted to the input 37. This signal is conducted to a bistable multivibrator having the transistors 62 and 63.

The collector of transistor 63 is connected by a diode 64 with a gating transistor 65. The pulses that are derived from the activity of the heart, and which come from the input amplifier to the second input 38 of the regulating stage 16, can be conducted through a resistance 66 to the second input of the multivibrator, which is the base of transistor 63. A pulse of this kind turns transistor 63 on and transistor 62 off. The base-emitter path of the gating transistor 65 is shorted out through the diode 64 and the transistor 63, so that any pulses appearing at the third input 39 are not conducted by the transistor 65 to the input of the multivibrator having the transistors 53 and 54. Were they conducted, the value of the adjustable resistance (44-46) would have been increased.

Consequently, so long as pulses derived from the activity of the heart appear at the second input 38, the value of the adjustable resistance cannot be changed, not even if pulses are conducted to the first and third inputs 37 and 39.

Only when the pulse generator 14, as a consequence of no, or late, pulses derived from the activity of the heart, sends a control pulse to the output stage 15 and a pulse to the regulating stage 16 by way of the input 39 does a wide pulse appear at the first input 37, whereby the multivibrator having the transistors 62 and 63 is triggered to its other state at the end of the wide pulse, so that the transistors 62 and 63 are respectively conducting and cut off. The short circuit shunting the base-emitter path of the transistor 65 is consequently broken, the result of which is that the next pulse appearing at the input 39 causes a change in the value of the adjustable resistance, provided that the multivibrator having the transistors 62 and 63 is not triggered back to its original state. However, if the previous stimulation pulse did cause the heart to contract, a corresponding pulse appears at the second input 38, and the transistor 63 once again conducts and the base-emitter path of the transistor 65 once again is shorted. If the activity of the heart should again later fail, there is again produced in this manner a stimulation pulse of the same reduced intensity as before.

If the intensity of the first stimulation pulse is too weak to cause a sufficient contraction of the heart, no pulse appears at the second input 38, causing the transistor 63 to be triggered to conduct. The base-emitter path of the transistor 65 is no longer shorted out; and the pulse at the third input 39, appearing simultaneously with the second stimulation pulse, turns the transistors 53 and 54 respectively off and on. The resistance 46 consequently is no longer shunted across the resistances 44 and 45, so that the next stimulation pulse is more intense.

If pulses derived from the activity of the heart again appear at the second input 38, after generation of stronger stimulation pulses, the step-up action of the regulating stage is suspended in the manner previously described.

If the stronger stimulation pulse is still too weak to cause the heart to contract, no pulse appears at the second input 38; and the next pulse appearing at the third input 39 is also transmitted by the transistor 65. As a consequence, a multivibrator having the transistors 53 and 54 is triggered back to its initial state, and the transistor 53 again conducts. While this multivibrator is being reversed, the multivibrator having the transistors 51 and 52 is triggered, so that transistor 51 is cut off. Consequently, resistance 45 is no longer shunted across the renewed parallel combination of the resistances 44 and 46; and the value of the adjustable resistance is greater than before, since the value of the resistance 44 is smaller than that of resistance 46.

If this still more intense stimulation pulse is not efficacious, a third pulse at the third input 39 again triggers the multivibrator having the transistors 53 and 54, so that 54 now conducts and 53 is cut off. This triggering does not affect the other multivibrator (51, 52). Since both transistors 51 and 53 are cut off, a capacitor 67 is free to charge, turning on a transistor 68 that shorts out the base-emitter path of the transistor 65 until the capacitor 67 is discharged. So long as the latter is not discharged, all pulses appearing at the third input 39 are not transmitted by the transistor 65. The two conducting transistors 52 and 54 short out the base-emitter path of transistor 53, the latter cutting off transistor 55 and removing resistance 44 from the shunt connection. Since the other two resistances 45 and 46 are also removed from the circuit, because the transistors 51 and 53 are off, the potentiometer 31 is no longer shunted; so that the simulation pulses subsequently generated are of the next, adjusted intensity.

The multivibrators having the transistors 51 and 52, 53 and 54, and 62 and 63 can be returned to their initial states by briefly turning the switch section Se to its position IV, whereupon the heart stimulator again generates weak pulses, which, if they have no effect, are automatically increased in intensity to an adjustable maximum value.

The PACEMAKER described is particularly suitable in combination with an intracardiac electrode for stimulating the activity of the heart. Any change in the position of this electrode during monitoring and the attendant change in the resistance from one electrode to the other are automatically compensated for.

Although the preferred embodiment of the invention has been described, the scope of, and the breadth of protection afforded to, the invention are limited solely by the appended claims.

What is claimed is:

1. A method of monitoring and stimulating the activity of the heart, comprising the steps of generating pulses at a standard pulse rate, conducting stimulation pulses to the heart, converting the movements of the heart into electrical signals, and automatically increasing the intensity of the stimulation pulses to an adjustable maximum value when these electrical signals do not appear during one period of a standard pulse rate.

2. The method as defined in claim 1, wherein the electrical signals converted from the movements of the heart are derived from the intracardiac pressure.

3. The method as defined in claim 1, including the step of indicating the number of stimulation pulses.

4. A device for monitoring and stimulating the activity of the heart comprising an input amplifier for amplifying electrical signals derived from the activity of the heart, a pulse generator in circuit with said input amplifier for producing pulses at a standard rate, an output stage in circuit with said pulse generator for generating stimulation pulses, and a regulating stage connected to said output stage including means for automatically increasing the intensity of the stimulation pulses that follow a stimulation pulse that is too weak to produce said signals.

5. The device as defined in claim 4, wherein said output stage includes means for delivering widened stimulation pulses to said regulating stage, said means of said regulating stage comprising a first input connected to said output stage receiving therefrom and having means responding to a trailing edge of said widened stimulation pulses, a second input in circuit with said input amplifier for receiving pulses from said input amplifier, a gate cutoff whenever said second input receives pulses, a third input connected to said pulse generator for receiving from said pulse generator pulses at the standard rate, said gate being connected in circuit with said third input.

6. The device as defined in claim 5, further including means for differentiating the widened pulses connected with said first input, said differentiating means being in circuit with said regulating stage.

7. The device as defined in claim 5, wherein said means of said regulating stage further comprises a plurality of resistances, a plurality of switching transistor means in circuit with said gate for connecting and disconnecting, in response to signals passed by said gate, said plurality of resistances in various combinations between two points of said regulating stage, so as to increase in steps the intensity of the stimulation pulses, and a potentiometer for regulating the intensity of the stimulation pulses connected between said two points.

8. The device as claimed in claim 7, including a cutoff circuit for suspending the step-by-step action of said regulating stage when the adjustable maximum value of the stimulation pulses is reached.

9. The device as defined in claim 4, further including a counter for indicating the number of stimulation pulses generated.

* * * * *